F. L. FULLER.
CASH REGISTER.
APPLICATION FILED JUNE 27, 1918.

1,336,693.

Patented Apr. 13, 1920.
5 SHEETS—SHEET 1.

Inventor
FREDERICK L. FULLER
BY
Earl Beust
Attorney

F. L. FULLER.
CASH REGISTER.
APPLICATION FILED JUNE 27, 1918.

1,336,693.

Patented Apr. 13, 1920.
5 SHEETS—SHEET 2.

Inventor
FREDERICK L. FULLER
BY
Earl Benst
Attorney

F. L. FULLER.
CASH REGISTER.
APPLICATION FILED JUNE 27, 1918.

1,336,693.

Patented Apr. 13, 1920.
5 SHEETS—SHEET 3.

Inventor
FREDERICK L. FULLER
BY
Earl Burst
Attorney

F. L. FULLER.
CASH REGISTER.
APPLICATION FILED JUNE 27, 1918.

1,336,693.

Patented Apr. 13, 1920.
5 SHEETS—SHEET 4.

Inventor
FREDERICK L. FULLER
BY
Attorney

F. L. FULLER.
CASH REGISTER.
APPLICATION FILED JUNE 27, 1918.

1,336,693.

Patented Apr. 13, 1920.
5 SHEETS—SHEET 5.

Inventor
FREDERICK L. FULLER
BY
Earl Beust
Attorney

UNITED STATES PATENT OFFICE.

FREDERICK L. FULLER, OF BRIDGEPORT, CONNECTICUT, ASSIGNOR TO THE NATIONAL CASH REGISTER COMPANY, OF DAYTON, OHIO.

CASH-REGISTER.

1,336,693.

Specification of Letters Patent.   Patented Apr. 13, 1920.

Application filed June 27, 1918. Serial No. 242,255.

*To all whom it may concern:*

Be it known that I, FREDERICK L. FULLER, a citizen of the United States, residing at Bridgeport, in the county of Fairfield and State of Connecticut, have invented certain new and useful Improvements in Cash-Registers, of which I declare the following to be a full, clear, and exact description.

This invention relates to improvements in cash registers and the like, the primary object being to devise a mechanism which is adapted to be transported from place to place by the operator, thereby making it very adaptable for use among ice men, milk men, expressmen, insurance collectors, and in fact collectors of every description. The machine is designed to be closed up as much as possible so that dust, dirt, water, etc., will be kept out of the mechanism, because it may be subjected to all kinds of weather and all sorts of other conditions when being used by collectors and others heretofore mentioned.

The present machine is designed to register amounts and issue checks commensurate with these amounts.

Another object of the present improvement is to provide the machine with a record strip, and a device coöperating therewith, whereby the same is adapted to receive autographic notations. Being thus provided with a check issuing device and a record strip, the machine affords protection to the customer or payer and also to the proprietor or manager of the business. The check is given to the customer as a receipt, and the record strip receives an impression identical to that printed on the issued check so that the proprietor is provided with a printed record of every transaction that has taken place.

The present invention differs from a former machine, invented by the applicant and disclosed in a pending application Serial No. 220,752 filed March 6, 1918, in that, the present mechanism is provided with an autographic device while the mechanism in the application referred to does not have such autographic feature. The present machine is also provided with a plurality of printing mechanisms, whereas the mechanism in the application above referred to is provided with only one printing mechanism.

A further object of the present invention is to provide a record strip that is adapted to receive the printing so that said printing may be read as usual. This is done in order to prevent the use of transparent paper and printing backward thereon which makes it necessary to read through the paper, as is the case in the machine described in the application, Serial No. 220,752 filed March 6, 1918, above referred to.

The mechanism herein is so designed that by omitting certain of its elements and inclosing the mechanism with a cabinet slightly changed in shape the machine is rendered capable of printing on inserted slips or other papers.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Described in general terms the machine comprises, a series of settable slides, whereby an amount received, account, ledger or other special numbers and date are set upon the type bars and type wheels corresponding with said slides, a plurality of printing mechanisms coöperating with said type wheels and type bars, means for inking the type thereof, a check issuing device, a record strip and means for feeding same, an autographic feature associated with said record strip, a counter and device for engaging said counter with an actuating mechanism, an operating handle coöperating with a driving mechanism whereby the above devices are made to perform their various functions, a full stroke device for said operating handle, and a suitable framework for supporting the above mentioned mechanisms. The settable slides representing the amounts and account or ledger numbers are inscribed with integers 9–0 and dashes. These integers represent various units of a monetary system. Adjacent each inscription is a hole or pocket whereby the slides may be reciprocated by a pencil point, stylus, or any other suitable operating element, inserted in said holes. The date slides are also provided with suitable inscriptions and holes associated therewith.

The functions of the mechanism will now be described, the machine being used by a collector of insurance, this line of business being taken merely as an example since it will be readily understood that the same is adapted for use in any analogous business and it is not intended to limit its application to the line of business in connection with which it is described herein. The machine may be inclosed in a leather, or any other suitable case having a strap fastened thereto so that it may be conveniently carried about. The collector upon receiving a premium payment from a policy holder moves the settable slides, positioned beneath the inscriptions, "Dollars" and "Cents" on the index plate, so they will indicate the amount received. In a like manner the other slides are manipulated to set up the date and policy holder's account or ledger number. A pencil or other operating element may be used for moving the slides by inserting it in the holes or pockets that are provided in the upper surface of the slides for this purpose. Simultaneous with the setting of the slides as described above, the type wheels and type bars are set to print the amount, date and account number, commensurate with the positioning of settable slides, onto the check and record strip, respectively. The operating handle is then given a complete revolution. At the proper time during an operation of a driving mechanism actuated by the operating handle, the type wheels and type bars are locked and the counter is thrown into engagement with an actuating mechanism, which coöperates with both, the type wheels and the counter. An impression mechanism is then operated to print the amounts, date, and account number on the check and record strip after which the slides are returned to their normal or home position. During the return of said slides the amount is accumulated on the counter, and the record strip is spaced for the next operation of the machine. Following the impression of the amount, etc., on the check strip, a cylinder provided with an electro is actuated to print on the check and also feeds it out of an opening made in the cabinet. The electro generally contains the name of the company and any other printing which the company may desire. The extended check is torn off by the collector and given to the payer as a receipt. The slides having been returned to normal position the autographic feature may be employed. For example the collector may write the payer's name or any other notation he may wish directly underneath the print on the record strip.

From the above description it will be seen that for every collection made the machine performs the same functions, therefore the amounts received will be accumulated on the counter and printed on the record strip. Upon returning to the office the collector leaves the machine with the manager. The manager has a key which he inserts in a suitable lock, on the side of the machine cabinet and gives said key a one quarter turn thereby engaging the counter with the actuating mechanism. A suitable operating element is placed in the hole opposite the integer 9 in each of the settable slides, beneath the inscriptions, "Dollars" and "Cents," and said slides are moved forwardly until they come to a stop, at which time the counter has been reversely rotated to its zero position and the amount accumulated thereupon has been set up on the type wheels and type bars. The crank handle is then operated and the operation of the machine is identical with the adding operation previously described. The amount which is now printed on both the check and record are identical and represent the total amount of money received by the collector. The check may be given to the collector from the company showing he has turned in his collections. The record strip contains an itemized account of the day's collection and also the total of said collections.

Figure 1:
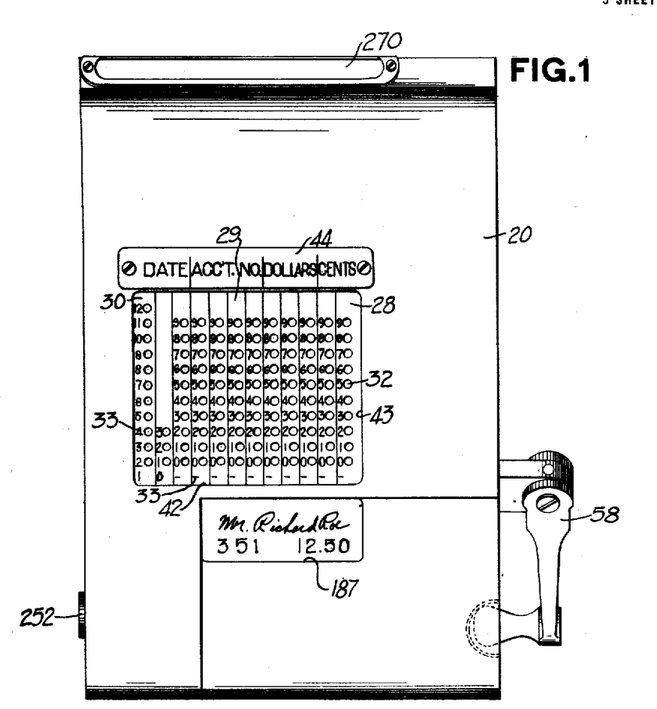
Figures 1 and 2 are full sized views showing in top plan and front end elevation, respectively, the improved registering mechanism.
Figure 2:
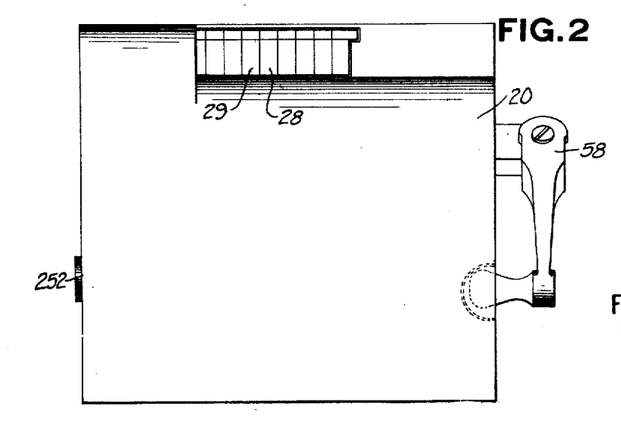
Figure 3:
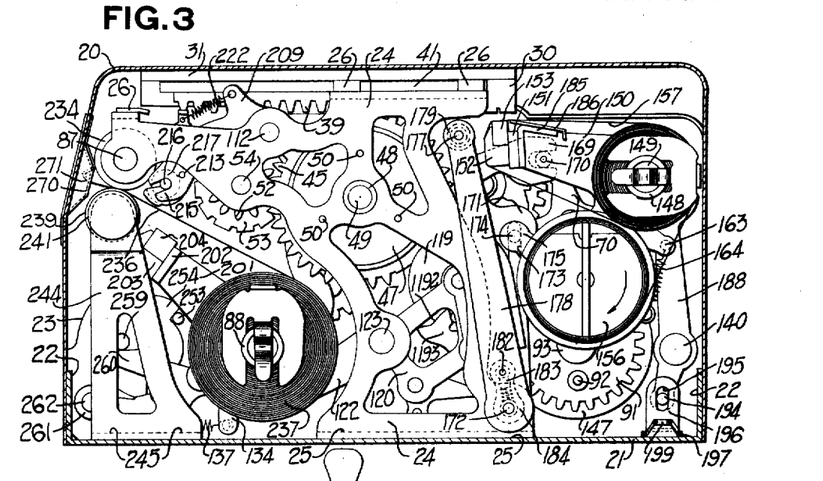
Fig. 3 is a full size elevation of the improved registering mechanism, the cabinet and part of the frameworks being shown in section.
Figure 4:
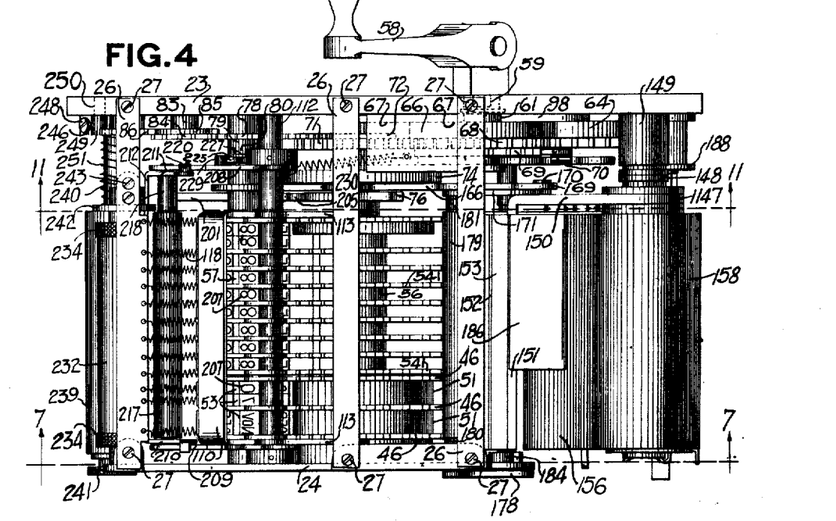
Fig. 4 is a top plan view of the improved registering mechanism, the settable slides and cabinet therefor being removed.
Figures 5, 6:
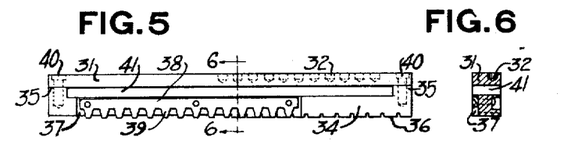
Fig. 5 is a detail view in side elevation of one of the settable slides.
Fig. 6 is a vertical sectional view taken on line 6—6 of Fig. 5 looking in direction indicated by the arrows.

With reference to the drawings and in which like reference numerals refer to similar parts throughout the various figures, the mechanism will be described in detail. Referring to Figs. 1, 2 and 3, it will be seen that the mechanism is inclosed in a suitable casing or cabinet 20. The various operating elements are supported in a framework which comprises, as best shown in Figs. 3, 4, and 5, a horizontal base 21 which has both ends formed vertically at 22, a vertical wall 23 and a vertically extending bracket 24 which is secured to the base 21 at points 25. The bracket 24 is tied to the wall 23 by means of rods 26 which are fastened by screws 27.

The setting mechanism.

Figure 7:
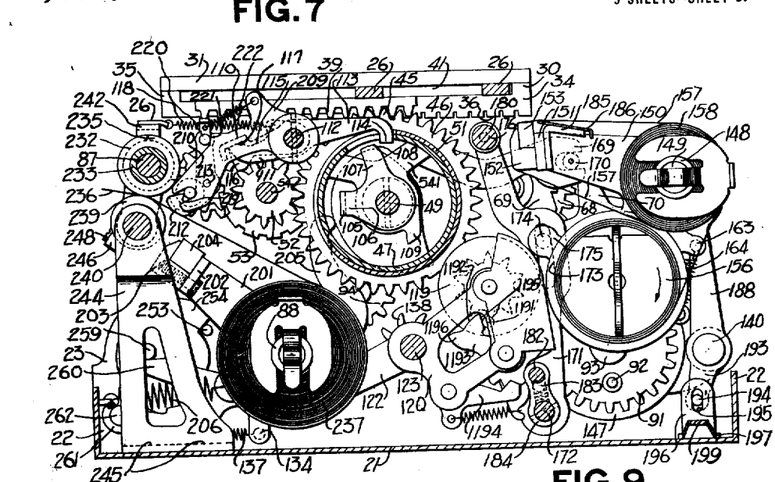
Fig. 7 is a vertical sectional view taken upon the line 7—7 of Fig. 4, and looking in direction of arrows.

The mechanism for positioning the type for printing on the check and record strip and which also sets up the actuator for accumulating on a counter, which will be hereinafter described, comprises, as illustrated in Figs. 1 and 2, five settable slides 28 for the amounts, four settable slides 29 for the account or ledger number, and three settable slides 30 for the date. Each slide consists of a plate 31 (Figs. 5 and 6) which is provided on the upper surface thereof with holes 32 adjacent which are inscribed characters 33, as is clearly shown in Fig. 1, and a bar 34 having an upwardly projecting part 35 on each end thereof. A portion of the lower surface of each bar 34 is also provided with type 36 bearing characters commensurate with the inscriptions 33 above described, and a groove 37 in which is rigidly fastened a plate 38 provided with teeth 39. The plate 31 is secured to the projections 35 on the bar 34 by screws 40 thereby forming a slideway 41 which is for the purpose of guiding the slides 28, 29 and 30, said slides being supported by two of the bars 26 as shown in Figs. 3 and 7.

To set up the date on the register the operator inserts a suitable operating element into one of the holes in each of the slides 30 one after the other and moves said slide, as selected, forward until the operating element is stopped by an edge 42 of an opening 43 which is provided in the top of the cabinet 20, as shown in Fig. 1. Fastened to the cabinet and positioned above the settable slides 28, 29 and 30, is an index plate 44 which is inscribed with the words "Date", "Account No.", "Dollars", "Cents". By the operation described above, the type 36, being a part of the slide 30 will be positioned for printing. The teeth 39 (Fig. 7) are engaged with teeth 45 of actuators 46 which are loosely mounted upon a hollow hub or drum 47 having integral therewith a sleeve 48, (Fig. 3) loose upon a horizontally disposed shaft 49 by which it is supported. The said sleeve projecting through the bracket 24 so that the end of the drum lies adjacent the bracket 24 and to which it is secured by pins 50 so that the drum is held against rotation. The gears 46, which are spaced by their respective hubs 51, mesh with pinions 52 which are fastened to the sides of the date wheels 53, which are loose on a shaft 54, so that when the slides 30 are manipulated the type wheels 43 will also be positioned for printing the date commensurate with that which has been set up by the movement of slides 30.

To set up an account number and the amount the settable slides 28 and 29 are manipulated in the same manner as slides 30, and have teeth 39 like the latter slides which mesh with the teeth 55 of the actuators 541 (Fig. 14) that are loosely mounted upon the shaft 49 and spaced thereon by their respective hubs 56 (Fig. 4). The teeth 55 of the actuators 541 mesh with pinions (not shown) exactly similar to the pinions 52, which are fastened to type wheels 57 (Fig. 4) that are also loosely mounted upon the shaft 54. By the manipulation of the slides 28 and 29 it is obvious that the type wheels 57 will be positioned commensurate with the movement of the slides to print the amount and account numbers. The settable slides are all kept from lateral movement by the teeth 45 and 55 of the actuators 46 and 541, respectively, which as above mentioned, are spaced laterally by their hubs.

Operating mechanism.

Figure 10:
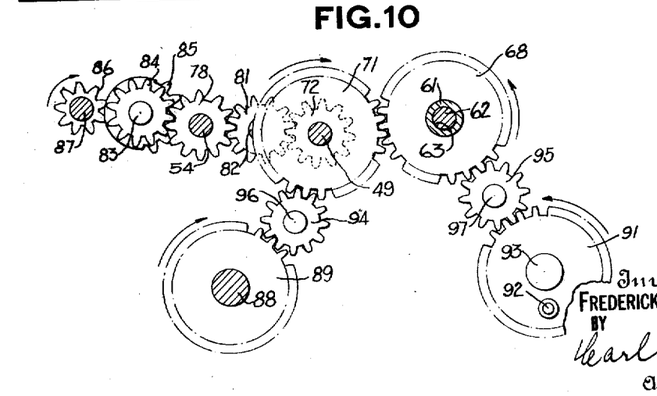
Fig. 10 is a detail view illustrating the driving mechanism for the various elements of the register.
Figure 11:
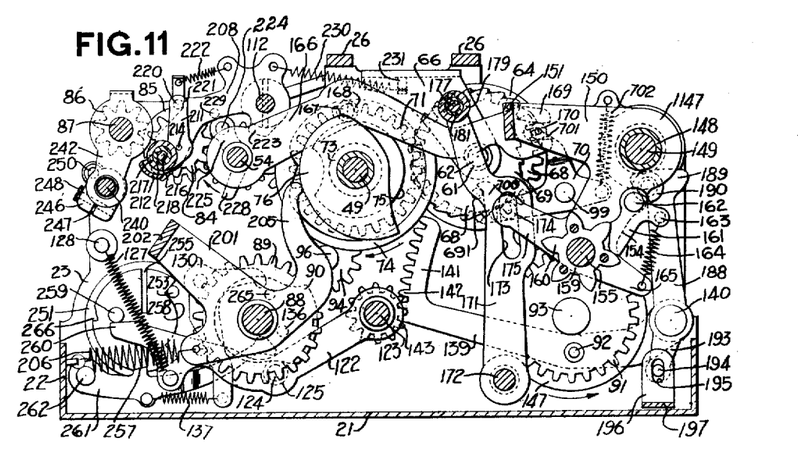
Fig. 11 is a vertical sectional view taken on line 11—11 of Fig. 4 and looking in the direction indicated by the arrows.
Figures 12, 13, 14, 15, 16:
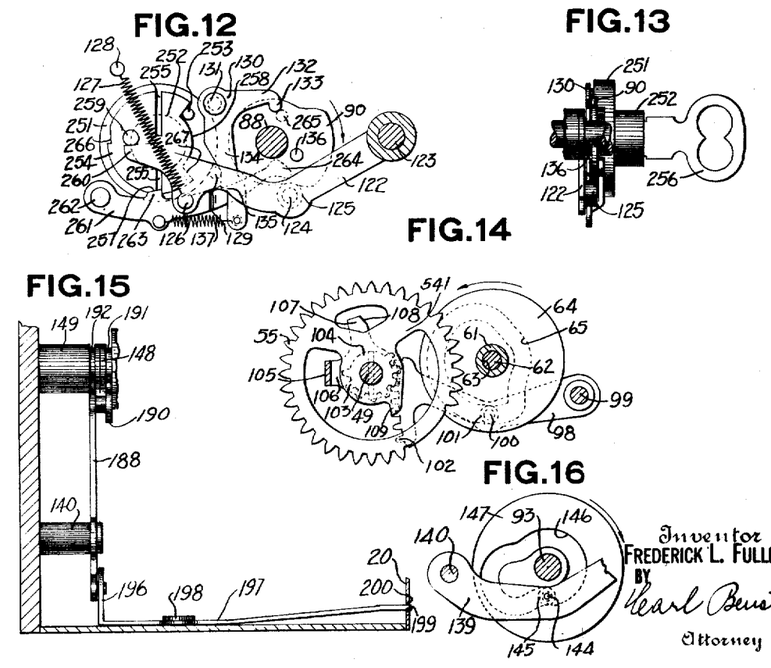
Fig. 12 is a detail view of the lock and its coöperating parts, for engaging the counter with the actuating mechanism during totalizing operations.
Fig. 13 is an end elevation of the mechanism illustrated in Fig. 12.
Fig. 14 is a detail view showing the mechanism coöperating with the settable slides for returning them to their home or normal position.
Fig. 15 is a fragmentary detail view having parts omitted, and illustrating the mechanism and construction whereby the record strip and impression platen therefor may be removed from the machine.
Fig. 16 is a detail view of the cam and a portion of the device for driving the counter transfer mechanism.

The mechanism which drives the various elements of the machine comprises, referring to Fig. 4, an operating handle 58 of the usual folding type, which is provided with a tenon 59 that fits within a mortise 60 formed in a hub 61. The operating handle has a reduced portion forming a stud 62 (shown in cross section in Figs. 10 and 14) which enters a hole 63 (Fig. 14) in the hub 61 and is held in place by any suitable means such as a plunger and spring (not shown) which coöperates with a V-shaped notch (not shown) in the stud 62. In Figs. 1 and 2 the handle 58 is shown folded in, and in Fig. 4 it is shown opened out for operating. The hub 61, which is rotatably mounted at one end in a bracket 66, fastened to the vertical wall 23 at points 67, has its other end rotatably mounted in the wall 23, (Figs. 4 and 11) and carries a disk 64 which has securely fastened thereto a gear 68. A snail ratchet 69 is secured to the gear 68 coöperating with the teeth of which is a pawl 70 which together forms a full stroke device identical with that fully described in the above mentioned Fuller application. As illustrated in Figs. 10 and 11, the gear 68 meshes with a gear 71, having fastened thereto a pinion 72. Said gear and pinion are mounted fast upon a hub 73 that is loose upon the shaft 49. Mounted loosely upon the shaft 54 and in the same plane with the pinion 72 is a pinion 78. Interposed between the pinions 78 and 72 is an idler gear 81 mounted loosely upon a stud 82 which is secured in the vertical wall 23. Mounted loose upon a stud 83, which is also secured to the vertical wall 23, and meshing with the pinion 78, is a gear 84 having fastened thereto a gear 85 which has teeth only on a part of its periphery and which coöperates with a pinion 86 which is fast upon a shaft 87. Referring now particularly to Figs. 10, 11 and 12, a fixed shaft 88 has a gear 89 loosely mounted thereon, by means of an idler gear 94 rotatably mounted on a stud 96, which is driven by the gear 71. A gear 91 is mounted loose on a fixed shaft 93 and which is driven by the gear 68 through an idler gear 95 rotatably mounted on a stud 97.

In order to drive the train of gears (Fig. 10) above described, the handle 58 is given a very slight movement in the reverse operating direction whereby a portion 700 (Fig. 11) of the pawl 70 is disengaged from a pin 691 of the ratchet 69. This movement of the handle 58 causes the nose 701 of the pawl 70, by a spring 702 stretched between said pawl and a stud carried by the wall 23, to engage the teeth of the ratchet 69. The handle may now be turned in the operating direction.

By referring to Figs. 4 and 10 it will be seen that by giving the handle 58 a complete revolution in the operating direction that, through the tenon 59 of said handle, and mortise 60 of the hub 61, the gear 68, will be revolved counter-clockwise, (Fig. 10) thereby through the idler gear 95 causing a counter-clockwise revolution of the gear 91. The revolution of the gear 68 will, as is indicated by the arrow, cause a clockwise revolution of the gear 71 and through the idler gear 94 cause a clockwise revolution of the gear 89. The pinion 72 being secured to the gear 71 will of course receive a clockwise revolution thereby causing the pinion 78, through the idle gear 81, to receive a clockwise revolution, which causes the gears 84 and gear 85 to be revolved counter-clockwise, and which at the proper time revolves the pinion 86 and the shaft 87 in a clockwise direction.

*Restoring and alining device.*

The mechanism for alining the type wheels and holding the settable slides in position, after they have been set for printing, and for restoring said type wheels and settable slides to their normal or home position so that they will be ready for a subsequent operation of the machine, and also for accumulating the amount, which has been set on the type wheels, on the counter, which will hereinafter be described, comprises, as illustrated in Fig. 14, a lever 98, rotatably mounted upon a stud 99, which is provided with a stud 100 having an anti-friction roller 101 thereon which coöperates with a cam race 65 of the disk 64. The rearwardly extending portion of the lever 98 is provided with a segmental portion having teeth 102 which mesh with teeth 103 of a pinion 104 that is pinned to the shaft 49. A bail 105 carried by parallel arms 106 which are provided with upwardly extending portions 107, are also fast upon the shaft 49. The actuators 541 (which it will be remembered are positioned by the settable slides) are provided near their centers with downwardly projecting portions 109, which coöperate with the bail 105, and which will be later described.

The alining device comprises, referring to Fig. 7, a bail 110 carried by arms 111, loosely mounted upon a shaft 112, and these arms have forwardly extending levers 113 each provided with a downwardly projecting nose 114, which are adapted to coöperate with the portions 107 of the arms 106. Coöperating with each of the gears 52, which it will be remembered are secured to the side of the type wheels, is a spring pressed pawl 115 loosely mounted upon the shaft 112, which is held by its spring so that a nose 116 formed thereon is in engagement with its associated gear 52. Each of the said pawls also has another nose 117 formed thereon which contacts with the lower surface of the bail 110.

It will be remembered that the type wheels 53 and 57 are rotated during the setting operation, thereby causing the pawls 115 and bail 110 to be rocked up and down, on the shaft 112, until the desired type has been set. The nose 116 of the pawl 115 is held firmly against the gears 52 by a spring 118 that is stretched between the pawls 115 and the rear tie rod 26, as is clearly shown in Figs. 4 and 7. The rocking of the bail 110 by the engagement of the pawls 115 with the gears 52, also causes the nose 114, of each of the levers 113 to be rocked up and down, therefore the upwardly extending portions 107 of the bail 105 which lie directly therebeneath are cut away at a point 108 to allow clearance for the downward movement of the noses 114.

Referring now particularly to Fig. 14, the configuration of the cam race 65 in the disk 64 is such that, when said disk is revolved by the hub 61 the roller 101 will be moved away from the hub 61 thereby causing the arm 98 to be rocked counter-clockwise on the shaft 99. This movement will, through the coöperation of the teeth 102 which are engaged with the teeth 103 of the gear 104, which is fast to the shaft 49, cause the shaft 49 to be rocked clockwise. It will be remembered that the bail 105 is rigidly secured to the shaft 49, therefore the portions 107, being a part thereof, will also receive a clockwise rotation which is sufficient to position said portions 107 directly beneath the noses 114 thereby preventing the rocking of the levers as previously described, and causing the pawls 115 through the bail 110 to be locked in engagement with the gear 52. This movement will prevent the type wheels 53 and 57 from getting out of alinement until after the printing has taken place. It will also be remembered that each of the gears 52 mesh with the teeth 45 of the actuators 46 which are engaged with the teeth 39 of the settable slides. The type 36, being a part of the settable slides 28, 29 and 30, will also be properly alined and held against movement when the impressions are taken therefrom.

At the proper time, after the printing has taken place and which will be later described, the arm 98 (Fig. 14) is rocked clockwise, through the actuation of the cam race 65 upon the roll 101, thereby causing the shaft 49 to be rocked in a counter-clockwise direction. During the setting operation, as previously described, the actuators 541 (Fig. 14) are rotated in a clockwise direction and are set differentially, therefore the projecting portions 109 thereof, will be set differentially. The shaft 49, as described above, being given a counter-clockwise rotation will also rotate the bail 105, it being fast thereto, which will cause it to engage the differentially set portions 109 of the actuators 541 which will also be rotated counter-clockwise and restored to their home or normal position. This movement of the actuators 541 will cause the settable slides 28, 29, the type 36 thereof, and the type wheels 57 to be returned to their normal or home positions. The actuators 46, (Fig. 7) which coöperate with the date slide 30 and date type wheels 53 and which are mounted upon the hollow drum 47, as previously described, are not provided with any portion 109 thereon to coöperate with the bail 105, therefore the date slide 30 and the date type wheels 53 will not be restored to their home or normal positions when the said bail is actuated.

*The counter.*

A counter 119 and framework 120 therefor, which is for the purpose of accumulating the amount of each transaction that takes place so that a total record may be obtained at any desired time, will not be described herein in detail, as it is identical with the counter which is fully described and illustrated in the above mentioned Fuller application. The mechanism for engaging and disengaging the counter with the actuators is not the same as that described in the above mentioned Fuller application, therefore a detail description of said mechanism will be given herein. Referring to Figs. 7, 11, 12 and 13, the counter 119 carried by the framework 120 is secured to a lever 122, loose upon a shaft 123. The lever 122 (Fig. 12) is provided with a laterally projecting stud 124 having an anti-friction roller 125 thereon which is held in engagement with the periphery of a plate cam 90 fast to the gear 89, by means of a coil spring 127 stretched between a stud 126 carried by the lever 122 and a stud 128 carried by the vertical wall 23. A lever 130, having a forwardly projecting arm 132 which is provided with a nose 133 that coöperates with a stud 136 which is secured to the plate cam 90, is mounted on a stud 131 carried by vertical wall 23. The downwardly extending portion 134 of the lever 130 is held against a stud 129 carried by the lever 122, by a coil spring 137 stretched between the lower end of the portion 134 and a stud carried by a lever 261.

It will readily be seen from the above description, that when the plate cam 90 is given a clockwise revolution, it being fast to the gear 89, as previously described, the lever 122 through the coöperation of the roll 125 upon the periphery of the cam 90 will be rocked in a counter-clockwise direction around the shaft 123, and thereby putting an extra tension upon the spring 127. By referring to Fig. 12 it will be seen that the portion 134 of the lever 130 is held firmly against the stud 129 by the tension of the coil spring 137. The stud 129 being fast to the lever 122 will of course be moved in a downward direction and thereby allowing the lever 130 to be rocked clockwise which will allow the stud 129 to fall beneath a shoulder 135 of the lever 130 thereby locking the lever 122 in its downwardly moved position. It will be remembered that the counter 119 and framework 120 thereof are securely fastened to the lever 122 which is mounted loosely on the shaft 123. Therefore when the lever 122 is rocked in a counter-clockwise direction the movement thereof is sufficient to engage gears carried by the wheels of the counter 119 (Fig. 7) with the actuators and to be held in such position by the shoulder 135 being held over the stud 129 of the lever 122. The counter 119 is thus held in engagement with the actuators until after the settable slides have returned to their home or normal position. During this movement it will be remembered, the actuators 541 are restored to their home position by the bail 105 engaging the positions 109 of said actuators whereby the amounts set upon the type wheels are accumulated upon said counter. Referring again to Fig. 12, the stud 136 is so positioned on the plate cam 90 that at the proper time during the revolution of the said cam, the stud 136 contacts with the nose 133 of the lever 130, rocking said lever counter-clockwise which disengages the stud 129 of the lever 122 from beneath the shoulder 135 of the portion 134 of the lever 130. This allows the spring 127 which has been put under extra tension to pull the lever 122 upward or clockwise around the shaft 123 which will simultaneously rock the gears of the counter wheels of the counter 119 out of engagement with the actuators.

Cams 138 (Fig. 7) which cooperate with pawls 1193 and 1194, for effecting the transfer movements in the counter, are pinned to the shaft 123. This movement is occasioned by a pin 1191 engaging an edge 1195 of the pawl 1193 and rocking said pawl counter-clockwise so that a portion 1196 thereof is placed in the path in one of the cams 138. These cams, and pawls and the transfer movements are identical with those which are fully described and illustrated in the above mentioned Fuller application and therefore will not be described further herein. The means for driving the transfer cams 138, so that they will engage the portions 1196 of the pawls 1193 to effect the transfer movements, is different from that which was described in the above mentioned Fuller application and therefore a detail description thereof will be given herein. Referring now particularly to Fig. 11, an arm 139, loosely mounted upon a stud 140 is provided at its rear end with a segmental portion 141 having teeth 142 which mesh with a pinion 143 pinned to the shaft 123. The arm 139 (Fig. 16) is also provided with a laterally projecting stud 144 having an anti-friction roller 145 thereon, which cooperates with a cam race 146 formed in a disk 147 that is securely fastened to the gear 91.

The configuration of the cam race 146 is such that, when the disk 147 is revolved by the gear 91, which was previously described, the arm 139 will first be rocked counter-clockwise and then in a clockwise direction, as viewed in Fig. 11. The movement of the arm 139 as just described will cause the gear 143 to be rotated first in a clockwise direction and then in a counter-clockwise direction. The gear 143 being secured to the shaft 123 will cause the said shaft and cams 138 which are fastened thereto, to be rotated likewise, thus effecting the transfer movements in the counter as is fully described and illustrated in the above mentioned Fuller application.

*The printing mechanism.*

The mechanism for printing the date, account number, and amount, of each transaction upon the record strip and means whereby the said strip is advanced after each print, together with means for inking the type will now be described referring to Figs. 3, 4, 7 and 11. A lever 1147 (Fig. 11) is secured to a sleeve 148 which is loosely mounted on a fixed shaft 149. The upper portion 150 of the lever 1147 is provided with a horizontally extending bail 151 which has secured thereto a block 152 (Figs. 3 and 7) cut away to receive a rubber platen 153 which is held between the said block and bail.

Mounted loose upon the shaft 54 and extending forward is a lever 166 (Fig. 11) which carries a stud 167 having mounted thereon an anti-friction roller 168 which cooperates with a cam race 75 in a disk 74 integral with the hub 73. The forward end of the lever 166 is bifurcated at 169 to receive a pin 170 which is secured to the lever 1147.

From the above description it will be seen that when the disk 74 is given a revolution, by the gear 71 as previously described, the lever 166, through the cooperation of the roller 168 thereon, with the cam race 75 will be rotated around the shaft 54, first, in a clockwise direction and then in a counter-clockwise direction. By the movement of the lever 166 as just described, the lever 1147 and sleeve 148 fast thereto, will be rotated first in a counter-clockwise direction and then in a clockwise direction around the shaft 149. The first, counter-clockwise, rotation of the lever 1147 will cause the platen 153 to be moved downward and then away from the type 36 so that an ink roll is operated to ink the said type for printing.

The mechanism for inking the type 36 which prints on the record strip 157, and is best shown in Fig. 11 comprises, a lever 171, fast upon a shaft 172. The lever 171 is provided with a slot 173 to receive a pin 174 that is fast to a lower extending portion 175 of the lever 1147 and integral therewith. The upper portion of the lever 171 has a hole 176 (shown in dotted lines in Fig. 7) for receiving the end of a shaft 177, which is secured to a lever 178 (Figs. 3 and 4) that is loosely mounted upon the shaft 172. Rotatably mounted on the shaft 177 is a roll 179 which is made of felt or any other suitable material to receive ink. The roll 179 is laterally spaced by a shoulder 180 (shown in section in Fig. 7) of the shaft 177 and a collar 181 (Figs. 4 and 11) pinned to the shaft 177. Laterally extending from the lever 178 is a pin 182 (Figs. 3 and 7) which enters a hole in an arm 184, that is fast upon the shaft 172, and is held therein by a spring pressed ball 183. Said ball and spring are carried within the arm 184 and coöperate with an annular groove (not shown) in the pin 182.

During the first counter clockwise movement of the lever 1147, as described above, the portion 175 of the lever 1147 and pin 174 thereon will of course be rotated in a counter clockwise direction. The slot 173 in the lever 171 is so formed as to allow the stud 174 to slide neutral a sufficient length of time so that the platen 153 will be lowered far enough to allow the roll 179 to ink the type without interfering therewith. The inking of the type just mentioned is accomplished by the stud 174 coöperating with the slot 173 in the lever 171 and rocking said lever in a clockwise direction when the lever 1147 is rotated counter-clockwise as previously described. The shaft 172 will also be rotated with the lever 171 it being fastened thereto, which will likewise cause the arm 184 to be rocked similar, it being also secured to the shaft 172. The lever 178 being provided with a stud 182 which enters a hole in the arm 184, as previously described, will also be rotated with the arm 184. From this description it will be seen that when the levers 171 and 178 are rotated in a clockwise direction the roll 179 mounted upon the shaft 177 which connects both levers at the uppermost portions thereof, will be moved slightly upward and forward until it rolls over the type 36 whereby said type will be inked for the next printing operation.

As soon as the roll 179 has passed over the type 36, which were positioned for printing, as previously described, and has inked them, it is immediately returned to its normal position by means of the pin 174 of the lever 1147 and the slot 173 in the lever 171. It will be remembered that the lever 1147 is rotated first counter clockwise which moves the platen 153 away from the type 36, and then rotated reversely. This latter movement causes the platen 153 to be moved upward and to be firmly pressed against the type 36 whereby the date, account number, and amount, commensurate with that set by the settable slides will be printed on the record strip, which lies between the type 36 and the platen 153, and which will be hereinafter described.

The mechanism for feeding the record strip will now be described. On a downward portion 154 of the lever 1147 is a stud 155 (Fig. 11) upon which is rotatably mounted a receiving roll 156, (Figs. 3 and 7) for a record strip 157, which is fed from a supply roll 158 rotatably mounted upon the sleeve 148. Rigidly secured to one end of the receiving roll 156 in a disk 159 (Fig. 11) which has teeth 160 on its periphery. Mounted in the gear 91 and extending laterally therefrom, is a stud 92 which coöperates with the teeth 160 of the disk 159 for feeding the record strip.

At the proper time the stud 92 being secured to the gear 91 which is revolved, as previously described, will contact with the teeth 160 of the disk 159 thereby causing said disk to be given a partial clockwise revolution. The record strip 157 (Fig. 3) is fed from the supply roll 158 beneath the block 152 and passed over the platen 153 and back over the roll 158 and then downward to the receiving roll 156, which, as previously described is fast to the disk 159.

A pawl 161 (Fig. 11) is held firmly against the teeth 160 by means of a spring 164 which is stretched between said pawl and a portion 165 of the lever 1147, whereby the said strip will always be held tight and not allowed to become loose upon the receiving roll or supply roll. The engagement of the stud 92 with the teeth 160 of the disk 159 is sufficient to feed the record strip a distance to space the impressions made thereupon.

Associated with the record strip is an autographic device which is comprised of an angular bracket 185 (Fig. 3) secured to the bail 151, and having fastened to its substantially horizontal portion a plate 186 which is of sufficient width to be used as a table for writing upon the record strip. Referring now to Fig. 1, it will be seen that the cabinet 20 is provided with an opening 187 which is large enough to allow the operator to see the last printed record on the strip with the exception of the date, and also make any autographic notation he may desire. Said notation is made directly above the account number and amount.

Figure 9:
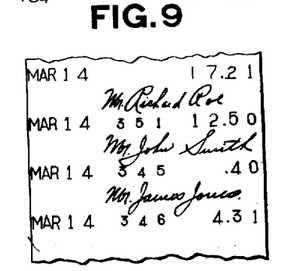
Fig. 9 is a detail view showing a portion of the record strip printed by the machine.

In Fig. 9 is shown a portion of the record strip. The printing at the extreme left of the strip represents the date. The number 351 represents the account number and the figures 12.50 at the right of the strip is the amount of money received. The name "Mr. Richard Roe" is the party whose account number is 351 and illustrates how the autographic feature may be employed.

The figures 17.21 shown at the top and right side of record strip (Fig. 9) represents the total of the previous record prints shown on said strip. The printing at the top and left side is the date.

The record prints are made one above the other instead of one below the other, as is generally the case, due to the direction in which the record strip is fed. Therefore the total amount will be printed above the record prints instead of below them.

The device for locking the record strip in place and for releasing same when it is necessary to replace the supply roll will now be described. Referring to Figs. 11 and 15, a lever 188 rotatably mounted on the stud 140, has its upper end formed T-shaped which carries a stud 190 that coöperates with a groove 191 in the sleeve 148. The T-shaped portion 189 coöperates with a groove 192 which is formed in the shaft 149 (Fig. 15). The lower portion 193 of the lever 188 is provided with a stud 194 which coöperates with a slot 195 in a vertically extended arm 196 of a lever 197 which is pivotally mounted upon the horizontal base 21 at 198 (Figs. 7, 11 and 15). A portion 199 of the lever 197 extends just through an opening 200 made in a door (not shown) of the cabinet 20. This door is kept locked and the key is held by the proprietor.

It will be remembered that the receiving roll 156 is mounted upon the shaft 155 that is secured to a part of the lever 1147, and which is fast to the sleeve 148 upon which is mounted the supply roll 158. Therefore it is obvious that if the sleeve 148 be released from the shaft 149 that the receiving roll and the supply roll would be removed together. After the door of the cabinet 20 has been removed from the machine, the portion 199 of the lever 197 is manually moved to the left (Fig. 7) which will, through the pin 194 and slot 195, cause the lever 188 to be oscillated counter-clockwise on the stud 140. This movement is sufficient to allow the stud 190 which is engaged with the groove 191 of the sleeve 148 to be disengaged therefrom. After the stud 190 has been disengaged, as just described, the sleeve 148, supply roll 158 and receiving roll 156 may be easily removed from the machine. The T-shaped portion 189 of the lever 188 is of sufficient width to keep it in engagement with its coöperative groove 192 in the shaft 149 after the stud 190 has been removed from the sleeve 148. This is made, as described, so that the sleeve 148 will always have to be put to its proper position when being replaced so that it can be locked. Otherwise the stud 190 will not engage the groove 191. Should the sleeve and new supply roll be put back on the machine and, even though it were put way back to its proper position, the operator should forget to move the lever 199 back to the right (Fig. 7) and try to replace the door he would not be able to do so because the opening 200 which is provided for the portion 199 would not be in the position to receive the said portion 199. Therefore it is very obvious that the record strip after being put back in the machine must also be securely locked as described above, or the operator will not be able to put the door back on the cabinet.

When the roll 179 (Fig. 3) requires inking it may be easily removed from the machine by taking hold of the lever 178 and pulling in a horizontal direction. This will cause the spring pressed ball 183 (Fig. 3) to be released from the groove (not shown) in the pin 182 that is carried by the lever 178 and also cause the said lever to be removed from the shaft 172. The shaft 177, which carries the roll 179, as will be remembered, is secured to the lever 178. Therefore the roll 179 will be removed from the machine when the lever 178 is removed.

After said roll has been inked the lever 178 is put back on the shaft 172 and pushed to place. This will cause the ball 183 to again engage the groove (not shown) in the pin 182 thereby locking the roll in place.

Figure 8:
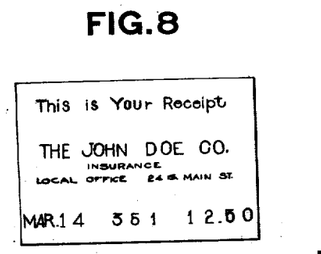
Fig. 8 is a full size detail view of a check which is issued by the register.

The mechanism for printing and issuing a check, a sample of which is shown in Fig. 8, comprises, a lever 201 (Figs. 7 and 11), rotatably mounted upon the shaft 88, and which carries a bail 202 to which is secured a block 203 cut away to receive a platen 204 which is held between said block and bail. The lever 201 is also formed with a goose neck portion 205 the upper end of which is held in contact with the periphery of a cam plate 76 by a coil spring 206 stretched between the said lever and the vertical portion 22 of the base 21. The cam plate 76 is secured to the hub 73 that is secured to and revolved by the gear 71 (Fig. 10) as previously described. The type wheels 53 are inscribed on their peripheries with characters 207 (Fig. 4) which are conmensurate with those inscribed on the settable slides.

The contour of the plate 76 is such that when it is given a revolution it will cause the platen 204, through the actuation of said plate on the goose neck portion 205 of the lever 201, to be moved downward, thereby causing an extra tension to be put on the spring 206. About one-third way around on the periphery of the plate 76, that is, from the point of contact with the goose neck portion 205, the contour of the said plate is very abruptly broken and runs toward the center shaft 49. Therefore when the goose neck leaves the highest portion of the periphery of the plate 76, it will allow the spring 206 which has been placed under extra tension to actuate the platen 204 and force it clockwise with a hammer like blow to force the check strip against the type wheels, whereby the date, account number and amount will be printed on the said strip. The spring 206 is so placed that it will normally hold the said platen 204 away from the type wheels after the impression has been made.

The device for inking the characters 207 comprises, an arm 208 (Fig. 11) fast upon the shaft 112, and an arm 209 (Fig. 7) also fast upon said shaft. Rotatably mounted on the arm 209 at point 213, and adjacent thereto, is a lever 210 (Fig. 7) and mounted on the arm 208 at point 214, and adjacent thereto, is a lever 211 (Fig. 11) which is connected to the lever 210 by a bail 212. The rear end of the arms 208 and 209 is bifurcated at 215 to receive the ends of a shaft 216 on which is loosely mounted a roll 217 that is of sufficient length to pass over all of the type wheels 53 and 57 and which is made of substantially the same material as is the roll 179 which was previously described. The roll 217 is kept from excessive lateral motion by a collar 218 mounted on the shaft 216 between said roll and the arm 211, as best shown in Fig. 4. The lower portion of the levers 210 and 211 are each provided with a curved recess 219 (Fig. 7) to receive the ends of the shaft 216. The upper end of said levers 210 and 211 are each provided with a pin 220 which is held against an edge 221 of the arms 208 and 209, by means of springs 222 which are stretched between the lever 210 and the arm 209 and between the lever 211 and the arm 208, as is viewed in Figs. 7 and 11. The roll 217 is normally held against an electrotype 235 by a spring 230 (Fig. 11) that is stretched between the arm 208 and a pin 231 that is secured to the bracket 66. The arm 208 (Fig. 11) is formed with a downward projection 223 which coöperates with a pin 224 carried by a lever 225 that is provided with a hub 226 in which is cut a mortise 227 (Fig. 4) to receive a tenon 80 of the hub 79 that is integral with the gear 78 (Fig. 10). The hub 226 (Fig. 4) is loose on the shaft 54 therefore when the gear 78 is revolved the lever 225 will be revolved therewith by means of the mortise and tenon connection above described.

From the above description it will be seen that as the lever 225 is revolved in a clockwise direction, as previously described, the pin 224 thereon will engage the portion 223 thereby causing said arm to be rocked counter-clockwise, whereby an extra tension is put on the spring 230. The arm 208 being pinned to the shaft 112 will cause the shaft to be rocked counter-clockwise and also the arm 209 which is fast to said shaft 112. The movement of the arms 208 and 209 is sufficient to carry the ink roll 217, mounted therein, downward so that said roll will contact with the type wheels thereby inking the same for printing. As soon as the pin 224 has moved the portion 223 of the arm 208 a sufficient distance to be disengaged therefrom, the spring 230 rocks the arms 208 and 209 to their normal position illustrated in Fig. 11. If the spring 230 should fail to work an arm 208 (Fig. 11) integral with the lever 225 will, during the revolution of said lever, strike a pin 229 which is carried by the arm 208 and cam said arm back to its normal position. During this movement of the arms 208 and 209, the bail 212 acts as a guard for the check strip so that it will not become smeared with ink from the roll 217.

The mechanism for printing on the check strip, other than that which is printed by the type wheels, and for feeding the check strip after receiving an impression from the type wheels comprises, a cylinder 232 (Figs. 4 and 7) that is fast on hubs 233 (Fig. 7) of disks 234 (Figs. 7 and 4) that are fast on the shaft 87. An electrotype 235 is mounted on the cylinder 232 so that when the shaft 87 is revolved, by the gear train illustrated in Fig. 10, an impression will be made on a check strip 236. This strip is fed from a supply roll 237, (Fig. 7) mounted on the shaft 88, the strip being drawn from the supply roll between the disks 234, which are knurled on their periphery, and a resilient roll 239 mounted eccentrically on a shaft 240. This shaft has bearings in a bracket 242 (Fig. 4) secured to the rear tie rod 26 by means of screws 243, and a vertically extending bracket 244 (Fig. 3) secured to the base 21 at point 245. The right hand end of the shaft as viewed from the front projects within an opening (not shown) made in the wall 23. The roll 239 is laterally spaced by the brackets 242 and 244. Mounted adjacent the wall 23 on the shaft 240 is an arm 246 that is split at 247 (Fig. 11) which allows said arm to be clamped securely to the shaft 240 by means of a screw 248. A hole 249 (Fig. 4) in the arm 246 receives a pin 250 that is carried by the wall 23. By clamping the arm 246 on the shaft 240 at different angles any desired pressure may be obtained between the knurled disks 234 and resilient roll 239, as the roll 239 is mounted eccentrically on the shaft 240 as described above. When a new check supply roll is in the machine it must be fed manually between the knurled disks 234 and the feed roll 239, therefore there must be an opening between the said roll and disks. This is provided by the operator taking hold of a knob 241 (Fig. 4) integral with the shaft 240 and pulling the said shaft horizontally until the arm 246 is released from the pin 250, and then turning said knob either to the right or to the left as is necessary to cause the feed roll 239 to be moved away from the disks 234, it being eccentrically mounted on the shaft 240. By referring to Fig. 7, it will be seen that the ink roll 217 is in such a position that when the shaft 87 is revolved the electrotype 235 will contact with the said roll 217 whereby ink from the said roll 217 will be deposited on said electrotype. Although the ink roll was moved out of contact with the electrotype to ink the type wheels previous to taking an impression therefrom, it was restored, as previously described to its normal position in contact with the electro, before the latter is operated to print and feed the check strip. The shaft 87 is revolved, at the proper time as previously described, thereby causing the electrotype 235 to print on the check strip, and also to extrude the printed portion thereof, through an opening 270 (Fig. 1) in the cabinet 20, so that it may be torn off by the operator by pulling it upward against a serrated plate 271 (Fig. 3) that is secured to said cabinet.

The portion torn off will resemble a check similar to the one shown in Fig. 8. The printing on the bottom line of the check is done by the type wheels and represents, from left to right, the date, account number and the amount. All other printing on the check is done by an electrotype while the check is being fed from the machine.

*Operation.*

Let it be assumed that, for example, the machine herein described is being used by an insurance collector. Let it also be assumed that the collector has received premium payment of $12.50 from a policy holder whose account number in the company's ledger is 351.

The collector moves the slides 28, 29 and 30 so that the type 36 thereon are set commensurate with the date, policy holder's account number 351 and the amount $12.50 received from the policy holder. Simultaneous with the movement of the slides, the actuators 46 and 541 are differently set, thereby positioning the type wheels 53 and 57 for printing on the check strip 236 (Fig. 7).

The remaining functions of the machine are performed by turning the operating handle 58 one complete revolution. Before said handle can be revolved in the operating direction it is necessary to rotate it reversely a slight amount. This reverse rotation causes the portion 700 (Fig. 11) of the pawl 70 to be disengaged from the pin 691 of the ratchet 69, and also causes the nose 701 of the pawl 70 to engage the teeth of said ratchet. The nose 701 is held in engagement with the teeth of the ratchet 69 by the spring 702 and will prevent the handle 58 from being turned backward after it has been started in the operating direction.

The first slight operating movement of the handle 58 will cause the lever 98 (Fig. 14) to be rotated counter-clockwise which will rotate the gear 103 and shaft 49 slightly clockwise. This movement is sufficient to position the portions 107 of the arms 106, beneath the nose 114 which will prevent the bail 110 from being moved, thereby locking the type wheels and also locking the settable slides through the pawls 116.

After the type wheels and slides are locked, the gears of the counter wheels comprising the counter 119 (Fig. 7) are thrown into engagement with the actuators 541. This is effected by the actuation of the plate cam 90 which causes the lever 122 to be rotated counter-clockwise (Fig. 11). The counter is held in engagement with the actuators 541 by the shoulder 35 by the lever 130. Said lever being rotated slightly by the spring 137 thereby causing the shoulder 135 to be positioned above the stud 129 of the lever 122 as the lever 122 is rotated.

After the counter has been engaged with the actuators 541 the lever 166 (Fig. 11) is rotated, by the cam race 75 of the disk 74, first in a clockwise direction then immediately in a counter-clockwise direction. This movement causes lever 1147 to be rotated counter-clockwise and then clockwise around the shaft 149. The first movement of said lever 1147 causes the platen 153 to be lowered and at the same time rocks the lever 171 in a clockwise direction whereby the ink roll 179 is moved slightly upward and forward so that it contacts with the type 36 thereby inking the same for printing on the record strip 157. The clockwise movement of the lever 1147 causes the lever 171 to be reversely rocked so that the roll 179 is moved back to its normal position. Simultaneously the platen is moved upward so that it presses the record strip against the type 36 whereby the characters thereon are printed on the said strip.

Simultaneous with the operation just described the arms 208 and 209 which carry the ink roll 217, are rotated counter-clockwise by means of the stud 224 which is secured to the lever 225. It being remembered that the lever 225 is revolved by the gear 78 which is fastened by means of the mortise 227 and tenon 80 (Fig. 4). The counter-clockwise movement of the arms 208 and 209 is sufficient to carry the ink roll 217 down in engagement with the type wheels 53 and 57 thereby inking the same for printing. As soon as the stud 224 leaves the portion 223 of the arm 208, the spring 230 acts and returns the said arms and ink roll to their normal position. The plate cam 76

(Fig. 11) is so formed that the lever 201 is rotated clockwise and suddenly released. This movement of said lever 201 causes the platen 204 (Fig. 7), by the actuation of the spring 206, to strike the check strip 236 and press it against the type wheels whereby the characters thereon, which have been previously positioned, are printed on the said check strip. The spring 206 also causes the platen 204 to be pulled away from the said type so that the check strip may be fed.

After the date, account number and amount, have been set upon the slides 28, 29 and 30 and type wheels 53 and 57 and impressions taken therefrom onto the check and record strip, as was described above, the shaft 49 is rotated in a clockwise direction by the lever 98, (Fig. 14) thereby causing the bail 105 to engage the portions 109 of the actuators 541 and to restore them to their normal position. This movement will also restore the type wheels 57 and slides 28 and 29 to their home position. The date wheels 53 and date slides 30 will not be restored to their home positions because the actuators 16, which engage with the said date slides and type wheels, are not provided with the portion 109 to be engaged by the bail 105. It will be remembered that the counter 119 is in engagement with the actuators 541 at the time the lever 98 is operated, therefore during the restoration of said actuators, the amount, which was set up by the slide 28, will be accumulated upon the counter.

Simultaneous with the restoring of the actuators 541 as described above, the stud 92 (Fig. 11) coöperates with the teeth 160 of the disk 159 thereby causing a partial revolution of the said disk that is secured to the receiving roll 156 (Fig. 7). This causes the record strip 157 to be spaced for the subsequent operation of the machine.

During the feeding of the record strip the gear 85 (Figs. 10 and 11) engages the gear 86 and revolves it in a clockwise direction which also revolves the shaft 87 and electrotype 235 thereon. The revolution of the shaft 87 causes the check strip to be extruded through the opening 270 (Fig. 1) in the cabinet 20. It also causes the electrotype 235 to print on said check strip.

After the amount has been accumulated on the counter 119, said counter is disengaged from the actuators 541 by the pin 136 (Fig. 12), on the plate cam 90, which coöperates with the nose 133 of the lever 130 thereby releasing the pin 129 from the shoulder 135 and allowing the spring 127 to rotate the lever 98.

The transfer movement in the counter, takes place after the counter has been disengaged. Said transfer movement is effected by the cams 138 (Fig. 7), which coöperate with the pawls 1193 and 1194, said cams being driven by the lever 139 (Fig. 11) and gear 143. This operation is fully described and illustrated in the above mentioned Fuller application. Therefore it will not be described herein.

During the latter part of the revolution of the handle 58 the bail 105 (Figs. 7 and 14) is returned to its home position. The shaft 87 is also finishing its revolution thereby feeding the check strip so that all the printing thereon is completely extruded.

The said check strip is now torn off and resembles a check, a sample of which is shown in Fig. 8.

The collector may now make any notation he desires on the record strip as the machine is provided with an autographic device.

*Totalizing mechanism.*

The mechanism for manually engaging the counter with the actuators so that a total may be taken therefrom comprises, as viewed in Figs. 12 and 13, a lock casing 251 a portion 252 of which extends through the cabinet 20. A disk 254 lies against one face of the lock casing 251 and has integral therewith a sleeve (not shown) which projects within an opening made through the lock casing 251 and its projecting portion 252, the fit between the sleeve and the opening being such that the sleeve is freely rotatable. This disk 254 as shown in Fig. 12 is provided with two oppositely arranged radial slots which are adapted to receive the prongs (not shown) of a suitable key 256 which may be inserted through the sleeve attached to the disk. Through this means by turning the key the disk 254 may be oscillated. In the periphery of the disk 254 are two small notches 257 and 266 and a cut away portion 258. The disk 254 also carries a laterally projecting stud 259 that coöperates with a nose 260 of the lever 122, previously described. A lever 261 mounted on a stud 262 is provided with a projection 263 which coöperates with the notches 257 and 266, as will be hereinafter described. The extreme end 264 of the lever 261 coöperates with a pin 265 that is secured to the cam 90.

To take the total of the amount that has been accumulated on the register the operator inserts the key 256, as previously described, far enough for the said key to engage the slots 255 of the disk 254. By means of the key 256, the disk 254 is given a one quarter turn in a counter-clockwise direction (Fig. 12) which will, through the engagement of the stud 259 with the nose 260 of the lever 122, cause the said lever 122 to be rotated in a counter-clockwise direction. It will be remembered that the frameworks 120 (Fig. 7) are secured to the lever 122, therefore when said lever is moved as just described the frameworks will be rotated counter-clockwise (Fig. 7) a distance sufficient to engage the counter wheel gears with the actuators, this engagement of the counter during adding operations being occasioned by the rocking of the lever 122 through the medium of the roller 125 and cam 90 as will be remembered. The lever 122 is automatically actuated during adding operations while during total taking operations it is actuated by a key. The movement of the disk 254, counter-clockwise, as just described also rocks the lever 261 in a clockwise direction around a stud 262, to which it is pivoted. This rocking movement is occasioned by the engagement of the true periphery of the plate with the projection 263 of the lever 261 and is sufficient to disengage the said projection from its normal position with the notch 257. As the disk 254 finishes its counter-clockwise movement the projection 263 is engaged with the notch 266 since the spring 137 holds the said projection against the periphery of the disk at all times. When the projection 263 is engaged in the notch 266 the disk 254 will be held against movement so that the counter will be locked in engagement with the actuators through the engagement of the stud 259 with nose 260 of the lever 122. This also prevents the key 256 from being removed from the lock casing until the counter 119 has been disengaged from the actuators and the disk 254 has been returned to its normal position. When the disk 254 is moved counter-clockwise a shoulder 267 of the cutaway portion 258 will engage the rear edge of the lever 130 whereby said lever will be oscillated counter-clockwise thereby rendering it ineffective. It will be remembered that during adding operations this lever 130 controls the disengagement of the counter and since during total taking operations the disengagement of the counter occurs at a different time and through different means the functions of this lever must necessarily be crippled. To prevent the key 256 from being turned too far the cutaway portion 258 is of such a length that its shoulder 267 will engage a pin 253, which is fast in the lock casing 251 thereby stopping the disk 254 from further travel.

After the key has been placed in the lock and given a quarter turn as above described, the operator inserts a suitable operating element in the hole 32 opposite the integer 9, of the slides 28, (Fig. 1) and moves said slides forward until arrested by a pin 1191, (Fig. 7) of the counter 119, which is given a counter-clockwise rotation and which engages the edge 1192 on the pawl 1193. This operation will not be described in detail as it is very fully illustrated and described in the above mentioned Fuller application.

During the movement of the settable slides 28, above described, the counter 119 will be reversely rotated until it reaches its zero position. When the counter has reached this position the amount therefrom will, through the actuators 541, have been set up on the type wheels and type 36 so that the said total amount that was standing upon the counter, may be printed upon the record strip and also the check strip. When the total is printed the impression will occur above the last amount printed upon the record strip shown in Fig. 9 instead of below as is generally the case.

At the proper time during the operation of the parts, the pin 265 carried by the cam 90 engages the end 264 of the lever 261 whereby said lever (Fig. 12) will be rocked clockwise to release its projection 263 from the notch 266 in the disk 254. This will allow the spring 127 to rotate the lever 122 clockwise a distance sufficient to disengage the counter from the actuators and at the same time to restore the disk 254, through the pin 259, to its normal position in which the key 256 may be removed. The settable slides 28 are restored to their home positions identically the same as during adding operations and the remainder of the various elements of the machine perform functions identical with those they perform during adding operations and therefore a description of their operations will not be given herein.

*Modification for printing on an inserted slip.*

Figure 17:
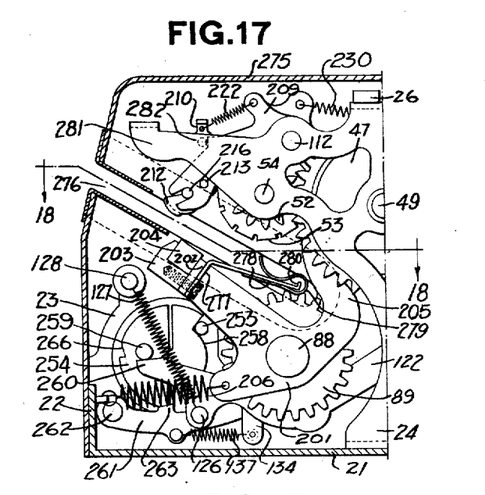
Fig. 17 is a side elevation and partly in section illustrating a part of the improved registering mechanism having elements omitted and inclosed in a modified form of cabinet whereby the machine is adapted to print upon inserted slips or other papers.
Figure 18:
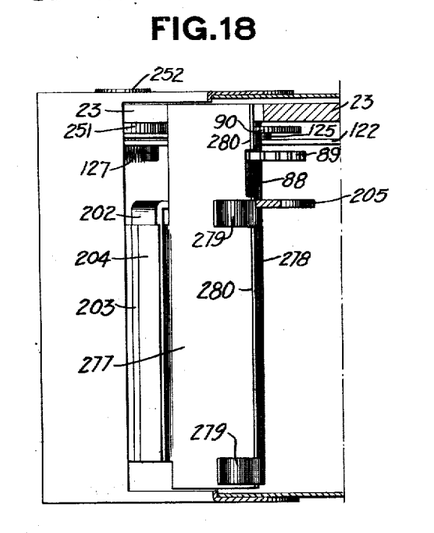
Fig. 18 is a horizontal sectional view taken on line 18—18 of Fig. 17 looking in the direction indicated by the arrows and showing particularly the holder for the slip or other inserted paper.

The machine herein may be adapted to print upon an inserted paper or slip instead of issuing a check as previously described. When these functions are to be performed the mechanism is inclosed in a different cabinet 275 (Fig. 17), which is designed to receive the inserted paper in a slot 276 made in the cabinet 275. Secured to the bail 202 is a bracket 277 to the under side of which is fastened a thin plate 278 having two parallel arranged clips 279 (Fig. 18) which are curved around the lower end of the bracket 277 (Fig. 17) so that they will come in contact with the upper surface of the said bracket, to receive and clamp the paper, inserted in the slot 276, between them and the bracket 277. The bracket 277 is provided with a ledge 280 which limits the inward movement of the paper so that it is correctly positioned to be printed upon. The portion of the bracket 24 which carries the shaft 87 (Fig. 3) is changed as shown at 281 (Fig. 17) and also carries a pin 282 to engage the arm 209, and stop said arm in its normal position. It will be remembered that the arms 208 and 209 are fast to the shaft 112. Therefore the arm 208 will also be stopped in its normal position. The pin 282 is not necessary in the check issuing machine because the arms 208 and 209 are stopped by the roll 217 coming in contact with the electrotype 235.

Since no check is to be issued, various elements provided to perform these functions in the machine previously described may be omitted when an inserted paper is to be printed upon. These elements are, referring to Figs. 3, 4, 7, 10 and 11, the shaft 87 and all parts thereon, the shaft 240 and all parts thereon, the bracket 244, the gears 84 and 85 (Fig. 10) and the stud 83 therefor, and the check roll 237.

To print on the paper or slip, the operator inserts it in the slot 276 (Fig. 17) and pushes it forward until the same is stopped by the ledge 280 of the bracket 277. The machine is now ready to be operated in the manner described in connection with the check issuing machine. During this operation the paper is carried forward, by the platen 204, to engage the type wheels 53 and 57 so that the date, account number and amount will be printed thereon.

After the operation of the machine the inserted paper which was printed upon, is removed from said machine by the operator, as there is no device for extruding the paper.

While the form of mechanism herein shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:—

1. In a machine of the class described, the combination of a main operating mechanism, a manipulative reciprocating rack bar, a totalizer, a differentially movable actuator therefor operated by the bar, a rotatable element operated by the main operating mechanism for operatively engaging and disengaging the totalizer and the actuator in adding operations, a rocking bail operated by the main operating mechanism, means carried by the actuator and adapted to be engaged by said bail for restoring the actuator to normal position and thereby add upon the totalizer while the latter is in engagement with the actuator, a second rotatable element for operatively engaging the totalizer with the actuator in totalizing operations, said second rotatable element being operable to engage the totalizer with the actuator as a preliminary to a manipulation of the rack bar whereby said totalizer will be restored to zero and control the adjustment of said bar, said second rotatable element acting further to disengage the totalizer after the resetting of the same to zero and before said actuator has been restored to normal position.

2. In a machine of the class described, the combination of a main operating mechanism, a rocking bail operated thereby, a manipulative reciprocating rack bar, a totalizer, a rotatable printing element, a reciprocating printing element operated by said bar, a differential movable actuator operated by said bar to position the rotatable printing element, a rotatable element operated by the main operating mechanism for engaging and disengaging the totalizer and the actuator in adding operations, means carried by said actuator and adapted to be engaged by said bail for restoring said actuator to normal position, and a manually rotatable element operated as a preliminary to a manipulation of said bar in total printing operations to engage said totalizer with the actuator whereby the extent of movement of said rack bar and the positioning of both of said printing elements is controlled by the totalizer, an operation of said manaually rotatable element also disengages said totalizer after it has been reset and before said actuator has been restored to normal position.

3. In a machine of the class described, the combination of a main operating mechanism, a differentially movable actuator, a totalizer normally disengaged from said actuator, a totalizer engaging member, two totalizer disengaging members, two rotatable members adapted to operate the engaging member, means carried by one of the rotatable members for operating one disengaging member, another means carried by the same rotatable member for operating the other disengaging member, an operation of the other rotatable member moving one of the disengaging members to ineffective position and thereby rendering its respective operating means ineffective.

4. In a machine of the class described, the combination of a main operating mechanism, a differentially movable actuator, a totalizer normally disengaged from said actuator, a member rigid with said totalizer for operatively engaging the totalizer with the actuator, a rotatable element operated by the main operating mechanism for moving said member, a pivoted member adapted to engage said other member and hold it in its moved position, means carried by rotatable element for engaging said pivoted member and thereby disengage the totalizer from the actuator, a manually rotatable member for moving said rigid member and simultaneously engaging said pivoted member to render it ineffective, a pivoted lever moved by said rotatable member, and means carried by said rotatable element for engaging said pivoted lever and thereby disengage the totalizer from the actuator.

5. In a machine of the class described, the combination of a main operating mechanism, a rocking bail operated thereby, a totalizer, an actuator therefor, a manipulative reciprocating rack bar, means operated by the main operating mechanism for engaging and disengaging the totalizer and the actuator, means carried by said actuator and adapted to be engaged by said bail to restore the actuator to normal position and thereby actuate said totalizer after said totalizer has been automatically engaged with said actuator in adding operations, a manually operated rotatable member for engaging the totalizer with the actuator in total taking operations, and means carried by said manually operated member for rendering the totalizer disengaging means ineffective and thereby causing said totalizer to be disengaged from the actuators before they have been restored so that when said actuators are restored to normal position they will not actuate the totalizer.

6. In a machine of the class described, the combination of a main operating mechanism, a differentially movable actuator, a totalizer normally disengaged from said actuator, a member rigid with said totalizer for operatively engaging the totalizer with the actuator, means operated by the main operating mechanism for moving said member in adding operations, a pivoted member operated by said means for disengaging the totalizer in adding operations, a manually operated member for moving said rigid member in totaling operations and simultaneously engaging the pivoted member and rendering it ineffective.

7. In a machine of the class described, the combination of a main operating mechanism, a differentially movable actuator, a totalizer normally disengaged from said actuator, a member rigid with said totalizer for operatively engaging the totalizer with the actuator, a rotatable element operated by the main operating mechanism for moving said member, a pivoted member having a stepped shoulder adapted to engage said rigid member and hold it in its moved position, and means carried by said rotatable element for engaging said pivoted member and thereby disengage the totalizer from the actuator.

In testimony whereof I affix my signature.

FREDERICK L. FULLER.